United States Patent [19]
McKie

[11] 3,775,094
[45] Nov. 27, 1973

[54] COLLECTION OF SULFUR VALUES FROM FLUE GASSES GENERATED BY METALLIC SULFIDE SMELTING AND CONVERTING

[75] Inventor: Robert T. McKie, Marenisco, Mich.

[73] Assignee: Copper Range Company, New York, N.Y.

[22] Filed: Mar. 19, 1971

[21] Appl. No.: 126,368

Related U.S. Application Data

[63] Continuation of Ser. No. 748,090, July 26, 1968, abandoned.

[52] U.S. Cl. .................. 75/74, 423/242, 423/541
[51] Int. Cl. .................. C22b 15/04, C01b 17/50
[58] Field of Search ................. 23/2 SQ, 178; 423/541, 242; 75/74

[56] References Cited
UNITED STATES PATENTS

| | | |
|---|---|---|
| 2,073,039 | 3/1937 | Wilton et al. .......... 23/2 SQ |
| 2,080,779 | 5/1937 | Lessing .................. 23/2 SQ |
| 2,453,775 | 11/1948 | Beath et al. ............ 23/178 R |
| 3,386,798 | 6/1968 | Bevans et al. .......... 23/178 R |
| 3,477,815 | 11/1969 | Miller et al. .......... 23/178 R |
| 2,233,841 | 3/1941 | Lepsoe .................. 23/178 |
| 2,351,780 | 6/1944 | Palmrose ............... 23/178 |
| 2,696,424 | 12/1954 | Schoeffel .............. 23/178 |
| 3,281,236 | 10/1966 | Meissner ............... 75/74 |

Primary Examiner—Oscar R. Vertiz
Assistant Examiner—Hoke S. Miller
Attorney—Gerald Altman

[57] ABSTRACT

In the processing of nonferrous sulfide ores, the resulting flue gas, which contains sulfur dioxide, is passed through an aqueous scrubber containing calcium sulfate or calcium sulfite. The resulting $SO_2$ collection is several times greater than in the case of prior scrubbing techniques. This system also has application in scrubbing flue gas from sulfur bearing fuel.

1 Claim, 1 Drawing Figure

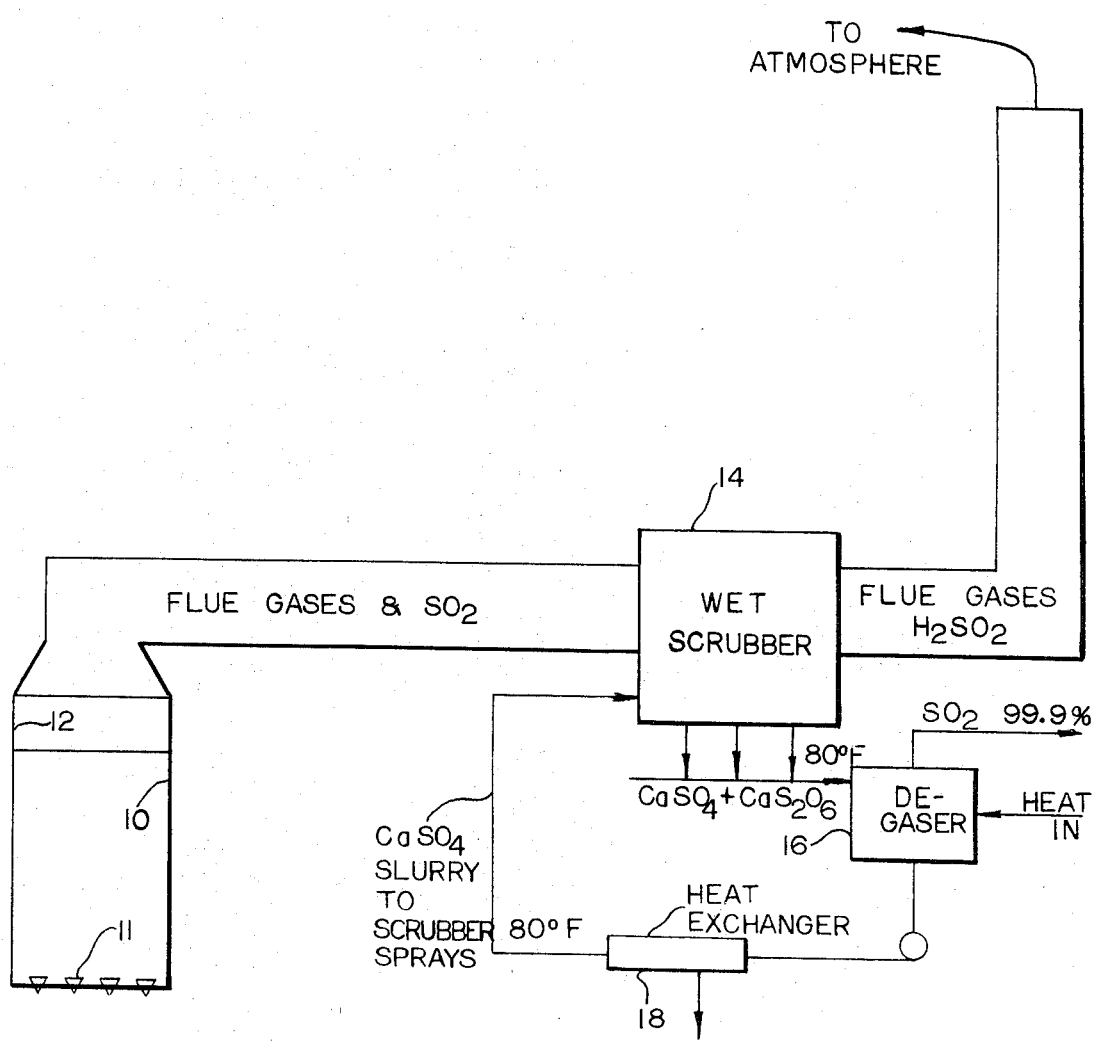

COLLECTION OF SULFUR VALUES FROM FLUE GASSES GENERATED BY METALLIC SULFIDE SMELTING AND CONVERTING

RELATED APPLICATION

The present application is a continuation of U.S. Pat. application Ser. No. 748,090, July 26, 1968, now abandoned.

BACKGROUND AND SUMMARY

The present invention relates to the processing of nonferrous sulfide ores, whereby first an ore or ore concentrate is smelted to a metallic matte and an initial barren slag, and then metallic matte is converted into the contained nonferrous metal, sulfur dioxide and augmented barren slag. In the foregoing process, the heat for smelting is generated by burning a carbonaceous fuel within the smelting furnace, with the result that the flue gas leaving the furnace contains the aforementioned sulfur dioxide. The sulfur dioxide constitutes both a pollutant and an undesired loss of sulfur when permitted to escape into the atmosphere.

SUMMARY OF THE INVENTION

The primary object of the present invention is to provide a superior sulfur dioxide trapping process involving passing a flue gas of the above type through an aqueous dispersion of calcium sulfate or calcium sulfite in order to form calcium compound of oxygen and sulfur, and heating the calcium compound of oxygen and sulfur after isolation in order to release the sulfur dioxide as desired. It has been found that the collection efficiency of calcium sulfate or calcium sulfite is much higher than prior analogous materials and that a high yield of sulfur dioxide from calcium compound of oxygen and sulfur can be achieved readily.

Other objects of the present invention will in part be obvious and will in part appear hereinafter.

The invention accordingly comprises the process characterized by the steps, conditions, concentrations and relationships, which are exemplified by the following detailed disclosure, the scope of which will be indicated in the appended claims.

BRIEF DESCRIPTION OF THE DRAWING

For a fuller understanding of the present invention, reference is to be had to the accompanying drawing wherein:

The drawing is a flow diagram of an illustrative process of the present invention.

DETAILED DESCRIPTION

Referring to the drawing, in accordance with the present invention, a nonferrous ore, i.e., an ore of copper, nickel, cobalt or lead, after being concentrated, is supplied as a charge to a reverberatory furnace 10 which is heated by burners 11. In reverberatory furnace 10, smelting occurs under conditions such that the metal oxide reacts with an iron or other sulfide (originally present or added as a flux) to form the metal sulfide and an iron or other oxide. The metal sulfide constitutes a matte. The heat for the furnace, which is generated by burning a carbonaceous fuel at 11, results in the formation of a large quantity of flue gas containing both metal bearing dust and sulfur dioxide, as well as the final combustion gases. From reverberatory furnace 10, the flue gas passes through a heat exchanger 12, in the form of a waste heat boiler. Next the flue gas passes through a wet scrubber 14, which captures the sulfur dioxide. Wet scrubber 14 is a so-called packed tower, in which a chemically resistant teflon or other plastic mesh or a multiplicity of interlaced metal baffles are sprayed continuously with a solution and slurry of the calcium sulfate or calcium sulfite at a temperature ranging from 50° to 100°F.

The reaction in wet scrubber 14 is as follows:

$$CaSO_4 + SO_2 \rightarrow CaS_2O_6$$

The resulting solution and slurry of calcium sulfate, calcium compound of oxygen and sulfur and water is fed to a de-gaser 16, in which heating occurs to a temperature ranging from 150° to 210°F. In consequence, separation of $SO_2$ gas occurs as follows:

$$CaS_2O_6 + \text{Heat} \rightarrow CaSO_4 + SO_2$$

The resulting solution and slurry of calcium sulfate is cooled by a heat exchanger 18 to a temperature ranging from 50° to 100°F. and recirculated through wet scrubber 14 for repetition of cycle.

In the foregoing process, the concentration of calcium sulfate or calcium sulfite in water is not critical, the only requirement being a stoichiometric excess with respect to the sulfur dioxide being collected. Good results are achieved with a fairly thick slurry of between 5 and 15 percent by total weight of calcium sulfate and/or calcium sulfite in water. With respect to the fluid passing into the de-gaser, any concentration of sulfur dioxide in excess of 10 grams per liter or 26 grams per liter of calcium compound of oxygen and sulfur will result in good recovery per pass. The calcium sulfate or calcium sulfite normally is the sole active material in the slurry. However, in some applications, calcium hydroxide or limestone is added to increase the calcium sulfite in accordance with the following reactions.

$$Ca(OH)_2(\text{Hydroxide}) + SO_2 \rightarrow CaSO_3 + H_2O$$

$$CaCO_3 (\text{Lime}) + SO_2 \rightarrow CaSO_3 + CO_2$$

In accordance with the present invention, a typical process involving the generation of sulfur dioxide involves copper production. A copper ore concentrate (following flotation of such an ore as chalcocite — $Cu_2S$, covellite-$CuS$, chalcopyrite — $CuFeS_2$, bornite — $Cu_5FeS_4$ and enargite - $Cu_3(As,Sb)S_4$ and roasting to lower the sulfur content) is charged into a reverberatory furnace and melted at a temperature of approximately 2,400°F. In reverberatory furnace 10, smelting occurs under conditions such that copper oxide reacts with iron sulfide (originally present or added as a flux) to form copper sulfide and iron oxide, the copper sulfide forms copper matte, some of the contained sulfur is oxidized to sulfur dioxide, and gasses leaving the furnace include a smoke and sulfur dioxide. The sulfur dioxide is captured by wet scrubber 14.

EXAMPLE

In an experimental demonstration of the sulfur dioxide collection process of the present invention, 1 liter of slurry was prepared from 200 grams of 200 to 325 mesh $CaSO_4$ powder and water. This slurry was gassed with $SO_2$ until 84 grams of sulfur dioxide was absorbed. The slurry was allowed to settle and the clear solution then was heated. At 110°F, $SO_2$ began to bubble out of solution, when the temperature reached 184°F, all the dissolved $SO_2$ was removed. As the $SO_2$ evolved from the solution, a copious feathery precipitate of $CaSO_4$ was formed.

The present invention thus provides an improvement in efficiency by utilizing gaseous effluents economically in order to save sulfur dioxide as a useful byproduct. Since certain changes may be made in the foregoing disclosure without departing from the present invention, it is intended that all matter described in the foregoing specification or shown in the accompanying drawing be interpreted in an illustrative and not in a limiting sense.

What is claimed is:

1. In a copper ore smelting process by which ore is smelted to metallic matte and initial barren slag and metallic matte is converted into contained copper, sulfur dioxide and augmented barren slag, the sulfur dioxide constituting part of a flue gas, the steps of passing said flue gas through a scrubber presenting means against which an aqueous scrubbing fluid is sprayed and in contiguity with which said flue gas is flowed, said aqueous scrubbing fluid including an aqueous solution and slurry of at least one reactant member of the class consisting of calcium sulfate and calcium sulfite said reactant member being in stoichiometric excess with respect to said sulfur dioxide, the temperature of said scrubbing fluid ranging between 50° and 100°F., said reactant member and said sulfur dioxide reacting to form a reaction product soluble in said scrubbing fluid, flowing said scrubbing fluid from said scrubber to a de-gaser, heating said scrubbing fluid in said de-gaser to a temperature ranging from 150° to 210°F. in order to remove sulfur dioxide therefrom, flowing said scrubbing fluid from said de-gaser and cooling said scrubbing fluid, and returning said scrubbing fluid to said scrubber, whereby continuous cycling of said scrubbing fluid and removal of sulfur dioxide from said flue gas occurs, said reactant member ranging between 5 and 15 percent by total weight of said scrubbing fluid, said scrubbing fluid flowing from said scrubber containing, by total weight, said reaction product in a concentration of at least 26 grams per liter, said at least one reactant member being the sole active material in said slurry and being in stoichiometric excess with respect to said sulfur dioxide, said cooling reducing the temperature of said slurry to from 50° to 100°F.

* * * * *